US011899404B2

(12) United States Patent
Winkler et al.

(10) Patent No.: US 11,899,404 B2
(45) Date of Patent: Feb. 13, 2024

(54) ASSEMBLY AND ALIGNMENT DEVICE, PARTICULARLY FOR A TIMEPIECE RESONATOR MECHANISM

(71) Applicant: ETA SA Manufacture Horlogère Suisse, Grenchen (CH)

(72) Inventors: Pascal Winkler, St-Blaise (CH); Jean-Luc Helfer, Le Landeron (CH); Raphaël Courvoisier, Corcelles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 270 days.

(21) Appl. No.: 17/027,775

(22) Filed: Sep. 22, 2020

(65) Prior Publication Data

US 2021/0124309 A1 Apr. 29, 2021

(30) Foreign Application Priority Data

Oct. 24, 2019 (EP) .................................... 19205005

(51) Int. Cl.
*G04B 29/02* (2006.01)
*G04B 17/06* (2006.01)

(52) U.S. Cl.
CPC ......... *G04B 29/022* (2013.01); *G04B 17/063* (2013.01)

(58) Field of Classification Search
CPC .... G04B 29/022; G04B 17/063; G04B 29/02; G04B 17/06
See application file for complete search history.

(56) References Cited

U.S. PATENT DOCUMENTS

| | | | | |
|---|---|---|---|---|
| 4,023,348 A * | 5/1977 | Giger | ..................... | G04B 29/04 968/266 |
| 8,619,504 B2 * | 12/2013 | Wyssbrod | ............. | G04B 29/04 368/76 |

(Continued)

FOREIGN PATENT DOCUMENTS

| | | |
|---|---|---|
| CH | 80991 A | 5/1919 |
| CH | 704 129 A2 | 5/2012 |

(Continued)

OTHER PUBLICATIONS

European Search Report dated Apr. 9, 2020 in European Application 192050052 filed on Oct. 24, 2019 (with English Translation of Categories of Documents Cited & Written Opinion), 8 pages.

(Continued)

*Primary Examiner* — Sean Kayes
(74) *Attorney, Agent, or Firm* — Oblon, McClelland, Maier & Neustadt, L.L.P.

(57) ABSTRACT

A device for assembly and alignment on a first bridge, particularly a timepiece movement plate, arranged in a first plane, the device including a second bridge arranged in a second plane, the second bridge being intended to carry a component, in particular a moving component of a timepiece resonator mechanism, the device including a device for aligning the second bridge on the first bridge, the alignment device including at least two bearing faces of the second bridge arranged orthogonally to the second plane in two different directions, the alignment device further including at least two movable adjustment pieces connected to the first bridge, the adjustment pieces each being configured to contact with one of the bearing faces to position the second bridge in a position on the first bridge, the movable pieces defining a plurality of positions of the second bridge on the first bridge.

11 Claims, 3 Drawing Sheets

(56) References Cited

U.S. PATENT DOCUMENTS

| | | | | |
|---|---|---|---|---|
| 9,122,246 | B2 | 9/2015 | Capt | |
| 2007/0091729 | A1 | 4/2007 | Takahashi | |
| 2012/0082010 | A1* | 4/2012 | Boulenguiez | G04B 17/325 368/184 |
| 2012/0134242 | A1* | 5/2012 | Wyssbrod | G04B 29/04 368/76 |
| 2014/0369173 | A1 | 12/2014 | Mertenant | |
| 2015/0093179 | A1* | 4/2015 | Morris | B62D 27/02 403/13 |
| 2017/0168455 | A1 | 6/2017 | Strahm et al. | |

FOREIGN PATENT DOCUMENTS

| | | | | |
|---|---|---|---|---|
| CH | 704129 | * | 5/2012 | |
| CH | 704189 | * | 6/2012 | |
| CH | 705 087 | A2 | 12/2012 | |
| CH | 709 903 | A2 | 1/2016 | |
| CH | 712225 | * | 9/2017 | |
| CH | 716400 | A2 * | 1/2021 | G04B 18/06 |
| CH | 716400 | * | 9/2022 | |
| CN | 102540855 | A | 7/2012 | |
| CN | 102968038 | A | 3/2013 | |
| CN | 105319944 | A | 2/2016 | |
| EP | 2 977 833 | A1 | 1/2016 | |
| EP | 3 144 741 | A1 | 3/2017 | |
| EP | 2 977 833 | B1 | 1/2018 | |
| FR | 532 255 | A | 1/1922 | |
| JP | 53-26978 | A | 3/1978 | |
| JP | 2019-109230 | A | 7/2019 | |
| RU | 2 665 774 | C2 | 7/2016 | |

OTHER PUBLICATIONS

Combined Russian Office Action and Search Report dated Mar. 11, 2021 in Russian Patent Application No. 2020134765 (with English transiation of Office Action ), 11pages.

Combined Chinese Office Action and Search Report dated Aug. 17, 2021 in Chinese Patent Application No. 202011145838.1 (with English translation of Category of Cited Documents), 9 pages.

Combined Chinese Office Action and Search Report dated May 5, 2022, in corresponding Chinese Patent Application No. 202011145838.1 (with English Translation of Category of Cited Documents), 8 pages.

Notice of the Reason for Refusal dated Aug. 31, 2021 in Japanese Patent Application No. 2020-160441 (with English language translation), 13 pages.

* cited by examiner

ASSEMBLY AND ALIGNMENT DEVICE, PARTICULARLY FOR A TIMEPIECE RESONATOR MECHANISM

CROSS-REFERENCE TO RELATED APPLICATION

This application claims priority to European Patent Application No. 19205005.2 filed on Oct. 24, 2019, the entire disclosure of which is hereby incorporated herein by reference.

FIELD OF THE INVENTION

The present invention concerns an assembly and alignment device, in particular for a timepiece resonator mechanism. The invention also relates to a timepiece movement resonator mechanism provided with such a device.

BACKGROUND OF THE INVENTION

Timepiece movements generally comprise a barrel, an escapement mechanism and a mechanical resonator mechanism. The resonator mechanism comprises a spring associated with an oscillating inertia weight called a balance. Nowadays, monolithic articulated structures or flexible bearings are used as the spring.

Flexible bearings with a virtual pivot can substantially improve timepiece resonators. The simplest are crossed-strip pivots, formed of two bearing devices with straight strips that cross, generally perpendicularly. These two strips may be either three-dimensional in two different planes, or two-dimensional in the same plane, in which case it is as if they are welded at their crossing point.

It is possible to optimise a three-dimensional crossed-strip pivot for a resonator, to try to make it isochronous with a rate that is independent of its orientation in the field of gravity, in particular in two ways (independently, or both together):

- selecting the position of the crossing of the strips with respect to their attachment point to achieve a rate independent of position;
- selecting the angle between the strips to be isochronous and having a rate independent of amplitude.

However, flexible bearings require particular configurations of the other elements of the resonator mechanism. For example, the pallets usually used are not suitable, since they have an angular travel that is too great for flexible bearings. Thus, in order to adapt the pallets, materials and shapes compatible with such a flexible bearing are used. However, these configurations require the position of the flexible bearing to be exact and controllable with high precision in order for the mechanism to work.

SUMMARY OF THE INVENTION

Consequently, it is an object of the invention to propose an assembly and alignment device, particularly for timepiece resonator mechanism, which avoids the aforementioned problems.

To this end, the invention concerns a device for assembly and alignment on a first bar or bridge, particularly a timepiece movement plate, arranged in a first plane, the device comprising a second bridge arranged in a second plane, the second bridge being intended to carry a component, particularly a moving component of a timepiece resonator mechanism.

The device is characterized in that it comprises alignment means comprising at least two bearing faces of the second bridge arranged orthogonally to the second plane in two different directions, the alignment means further comprising at least two movable adjustment pieces mechanically connected to the first bridge, the adjustment pieces each being configured to come into contact with one of said bearing faces to position the second bridge in a determined position on the first bridge, the movable pieces making it possible to define a plurality of positions of the second bridge on the first.

By means of this device, it is possible to assemble two bridges with great precision, in order to align timepiece components exactly, in particular for timepiece resonator mechanisms with flexure strips. Indeed, the bearing faces and the adjustment pieces make it possible to form centres of rotation about which the second bridge can partly rotate. Thus, these centres of rotation offer the second bridge degrees of freedom to place it in the best configuration, in particular so that components arranged on the first and the second bridge are properly aligned, for example between a pallet fork and a balance of a flexure strip resonator. The device makes it possible, in particular, to position the second bridge with respect to the first bridge, with the second bridge in contact with the first. According to an advantageous embodiment, the device comprises three bearing faces and three adjustment pieces, the three bearing faces being orthogonal to the second plane in three different directions.

According to an advantageous embodiment, the two bearing faces are substantially perpendicular.

According to an advantageous embodiment, the third bearing face forms an angle of 45° with each of the other two bearing faces.

According to an advantageous embodiment, each adjustment piece is rounded to form a pivot around which one of the bearing faces can rotate when an adjustment piece is actuated.

According to an advantageous embodiment, each bearing face borders a passage to the first bridge, the movable adjustment pieces each being arranged in one of said passages.

According to an advantageous embodiment, the adjustment pieces are movable in rotation.

According to an advantageous embodiment, the adjustment pieces are studs or screws each arranged in a passage orthogonally to the second plane, each screw being provided with a head and a shaft, at least one of said screws being eccentric, preferably all of the screws, the head being intended to be in contact with the bearing face.

According to an advantageous embodiment, the adjustment pieces are screws arranged in the second plane, each screw being provided with a head and a shaft, the shaft being intended to be in contact with the bearing face.

According to an advantageous embodiment, the adjustment pieces are movable in translation.

According to an advantageous embodiment, at least one of the passages, preferably all of the passages, has an oblong shape, the bearing face being defined by one side of said shape.

According to an advantageous embodiment, each passage has a width substantially equal to the width of the screw head.

According to an advantageous embodiment, the device comprises elastic prestressing means for holding the bearing faces against the adjustment means.

According to an advantageous embodiment, the first bridge has graduations to indicate the position of the second bridge.

According to an advantageous embodiment, the device comprises means for locking the second bridge onto the first.

The invention also relates to a resonator mechanism, particularly for timepiece movements, comprising a first bridge, in particular a timepiece movement plate. The movement is characterized in that it comprises an assembly and alignment device according to the invention.

BRIEF DESCRIPTION OF THE DRAWINGS

Other features and advantages of the present invention will appear upon reading the description of several embodiments given purely by way of non-limiting examples, with reference to the annexed drawings, in which.

DETAILED DESCRIPTION OF PREFERRED EMBODIMENTS

In a timepiece movement, particularly in a resonator mechanism with flexure strips, the components must be fixed and aligned with precision. The components comprise, for example, a flexure strip pivot, a balance assembled to the flexure strip pivot, a pallet fork whose reciprocating motion is caused by the balance and an escape wheel whose rate of rotation is controlled by the motion of the pallet fork.

Figure 1:
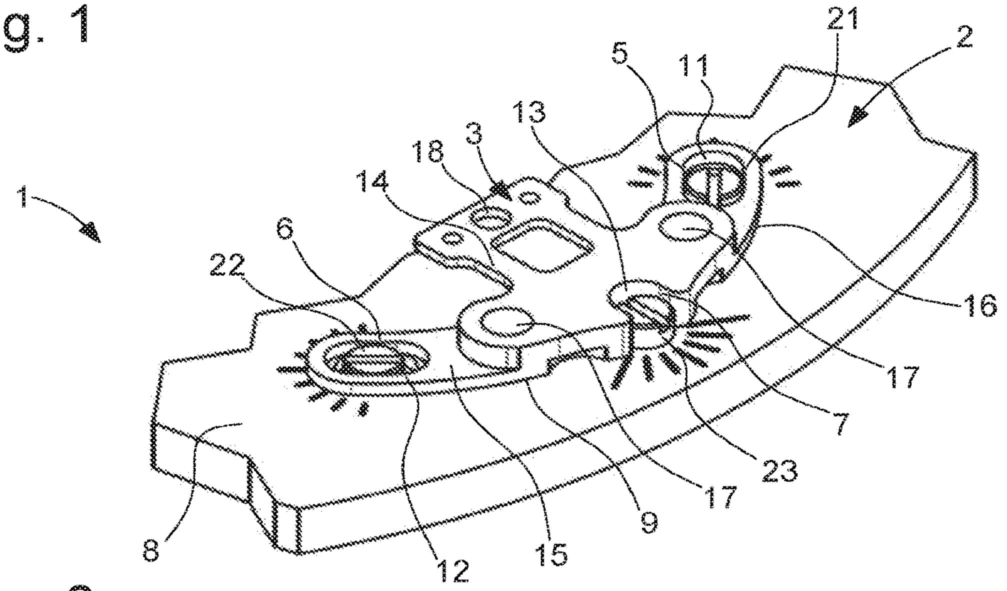
FIG. 1 represents a schematic perspective view of an assembly and alignment device according to a first embodiment of the invention.
Figure 2:
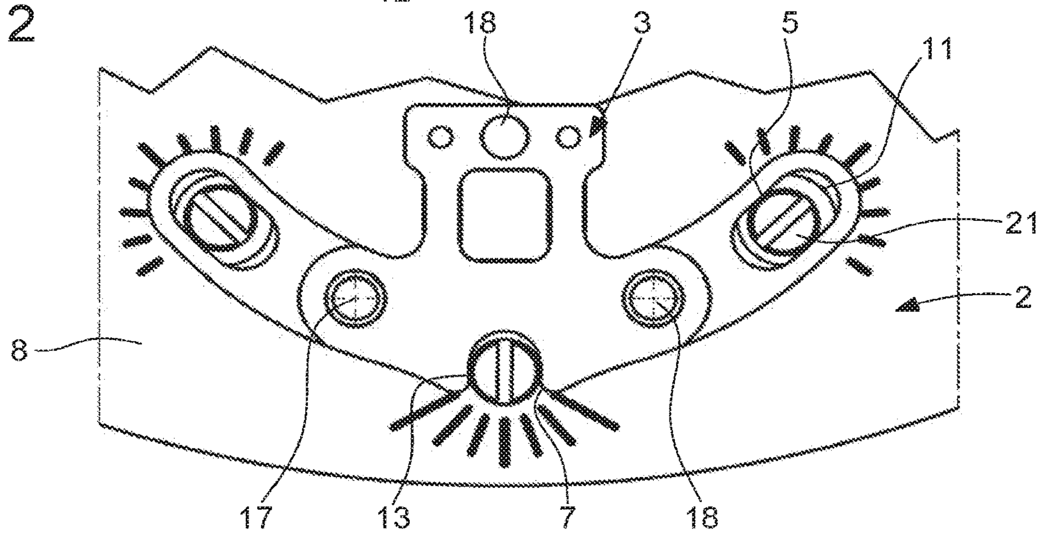
FIG. 2 represents a schematic top view of the device of FIG. 1.

FIG. 1 shows a first embodiment of a device 1 for assembling and aligning a component on a first bridge 2 arranged in a first plane. First bridge 2 is, for example, a timepiece movement plate, on which the components of a timepiece movement are intended to be arranged. First bridge 2 has a flat upper surface 8 for the arrangement thereon of components of a timepiece movement.

Device 1 has a second bridge 3 on which a component is intended to be fixed. Second bridge 3 is intended to be arranged on first bridge 2 in order to be assembled in a second plane, preferably parallel to the first. Second bridge 3 has an at least partly flat lower surface 9 for resting on upper surface 8 of first bridge 2 after assembly. Second bridge 3 has the shape of a ship's anchor provided with an axial portion 14 and with two slightly curved side arms 15, 16, which rise up on either side of axial portion 14 from the end of axial portion 14. Axial portion 14 comprises fixing holes 17 for permanently fixing second bridge 3 to first bridge 2, for example by means of ordinary screws passing through holes 17 to reach first bridge 2. The fixing operation is carried out after the alignment step. Second bridge 3 further comprises at least one assembly hole 18 for fixing the component on second bridge 3.

Device 1 further comprises means of aligning second bridge 3 on first bridge 2. The alignment means have at least three bearing faces 5, 6, 7, arranged on second bridge 3. Bearing faces 5, 6, 7 advantageously form part of second bridge 3. Second bridge 3 and faces 5, 6, 7 are in one piece and preferably made of the same material. Bearing faces 5, 6, 7 are advantageously flat and each oriented in a different direction.

Bearing faces 5, 6, 7 each border a distinct passage 11, 12, 13 to the first bridge. In FIG. 1, passages 11, 12, 13 are holes through second bridge 3. Thus, passage 11, 12, 13 makes it possible to access upper face 8 of first bridge 2. The through holes have an oblong shape comprising two sides and two rounded ends connecting the two sides to one another. The two sides are preferably flat. Bearing face 5, 6, 7 is defined by one of said sides of said oblong-shaped through hole. Preferably, bearing face 5, 6, 7 is formed of the side oriented towards axial portion 14.

Two passages 11, 12 are each arranged at a free end of one of arms 15, 16 of second bridge 3. Third passage 13 is arranged at the junction of the two arms and the central portion of second bridge 3.

The alignment means comprise at least three movable adjustment pieces 21, 22, 23 each arranged in one of said passages 11, 12, 13. Adjustment pieces 21, 22, 23 are mechanically connected to the first bridge, yet are still able to move. Adjustment pieces 21, 22, 23 are configured to come into contact with one of said bearing faces 5, 6, 7. Each piece 21, 22, 23 resists the translational motion of bearing face 5, 6, 7 in a determined direction. Thus, it is possible to adjust the position of second bridge 3 on first bridge 2 with precision. Adjustment pieces 21, 22, 23 allow second bridge 3 to be held laterally on first bridge 2 in a determined position in the second plane, in particular to align the component carried by second bridge 3 with the component or components carried by first bridge 2. Passages 11, 12, 13 are sized laterally to correspond to the diameter of the adjustment piece.

Preferably, pieces 21, 22, 23 have a rounded shape to form a pivot against which bearing face 5, 6, 7 can rotate slightly when an adjustment piece is actuated.

First bridge 2 further comprises graduations to indicate the position of second bridge 3 with respect to first bridge 2. The graduations are arranged near passages 11, 12, 13, here around the through holes arranged on free arms 15, 16. The graduations indicate, in particular, the position of each adjustment piece 21, 22, 23 on second bridge 3, which makes it possible to deduce the position of second bridge 3 on first bridge 2.

Figure 3:
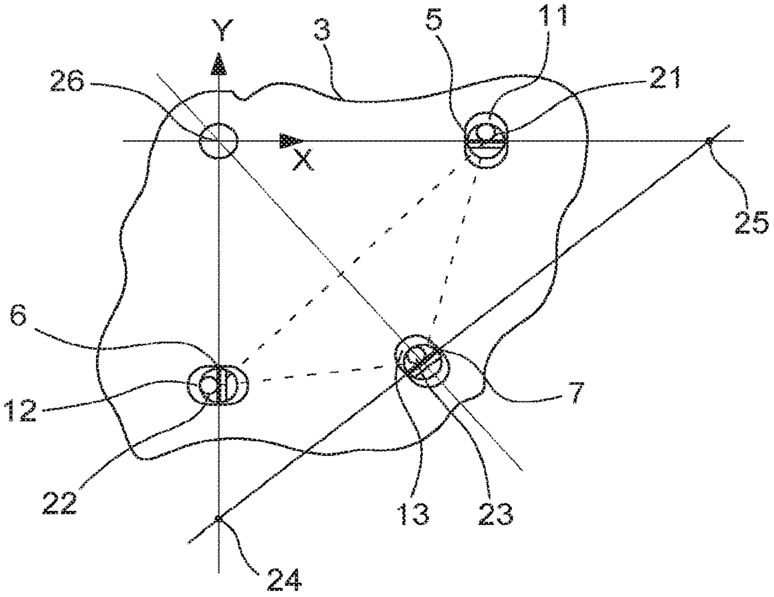
FIG. 3 schematically represents the arrangement of the device and of the centres of rotation about which the second bridge can rotate.

In FIG. 3, it is noted that bearing faces 5, 6 of the first two passages 11, 12 are substantially perpendicular. Bearing face 7 of third passage 13 is oriented to form an angle of 45° with each of the other two bearing faces 5, 6.

Bearing faces 5, 6, 7 and adjustment pieces 21, 22, 23 are arranged in three distinct positions of second bridge 3, each movable piece being able to exert a force on the corresponding bearing face 5, 6, 7, when one or other movable piece 21, 22, 23 is actuated. Thus, second bridge 3 can be moved on first bridge 2 via the mobility of each adjustment piece 21, 22, 23.

As shown in the diagram of FIG. 3, the three passages 11, 12, 13 are arranged at the vertices of an isosceles triangle.

Passages 11, 12, 13 are arranged such that there are two passages 11, 12 on the same straight line. The third passage 13 is arranged outside said straight line, such that the orthogonal projection thereof onto the straight line passes between the two other passages 11, 12. The passages are advantageously arranged such that the orthogonal projection onto said straight line is equidistant from the other two passages 11, 12.

The alignment means define three centres of rotation 24, 25, 26 about which second bridge 3 can partly rotate. By actuating adjustment pieces 21, 22, 23, it is possible to orient the first bridge with respect to the second. If one adjustment piece 21, 22, 23 is actuated, the second bridge rotates around the corresponding centre of rotation and further causes the other passages to move about the other adjustment means 21, 22, 23. Actuating the first adjustment means 21 causes a rotation of second bridge 3 about first centre of rotation 24. Actuating second adjustment means 22 causes a rotation about the second centre of rotation 25. Actuating the third adjustment means 23 causes a rotation about the third centre of rotation 26.

Further, the distances between the passages are chosen such that the distance between the third adjustment means 23 and the third centre of rotation 26 is greater than the respective distances between the first adjustment means 21 and the first centre of rotation 24, and between the second adjustment means 22 and the second centre of rotation 25.

In the embodiments represented in the Figures, adjustment pieces 21, 22, 23 are screws. The screws are arranged in holes in the first bridge through passages 11, 12, 13 of second bridge 3, so that they can turn inside said holes while still being mechanically connected to second bridge 3. The screws can turn, but they remain in the holes of first bridge 2.

Figure 4:
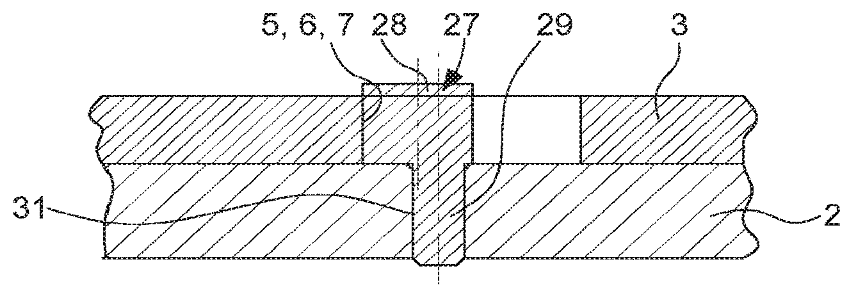
FIG. 4 represents a schematic sectional view of the device in the area of a passage and an eccentric screw.

As represented in FIG. 4, a screw 27 is provided with a head 28 and a shaft 29, with head 28 in contact with bearing face 5, 6, 7. The screws are eccentric so that head 28 can move bearing face 5, 6, 7 according to its angular position. Shaft 29 is not centred on head 28 but is offset with respect to the centre of head 28. Thus, when screw 27 is arranged inside hole 31, the bearing face can be moved by turning screw 27. Preferably, screw 27 has no thread, but is press-fitted into first bridge 2.

Figure 5:
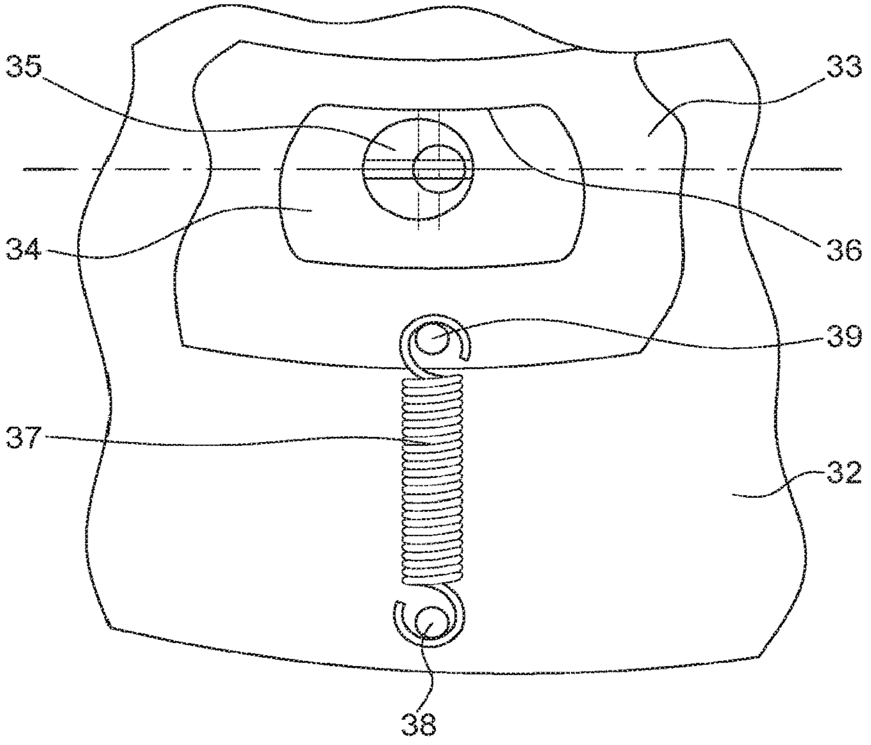
FIG. 5 represents a schematic top view of a device according to a first variant of the first embodiment in the area of a passage and an eccentric screw.

In a first variant of FIG. 5, passage 34 in second bridge 33 has any shape, which is wider than that of eccentric screw 35. To maintain the contact between screw 35 and bearing face 36, the device has elastic prestressing means 37. The prestressing means are a spring assembled to first bridge 32 by one end 38 and to second bridge 33 by a second end 39. Spring 37 is preferably stretched in a substantially perpendicular direction to bearing face 36 to hold bearing face 36 against screw 35. Further, spring 37 is arranged such that screw 35 is arranged between bearing face 36 and spring 37.

Figure 6:
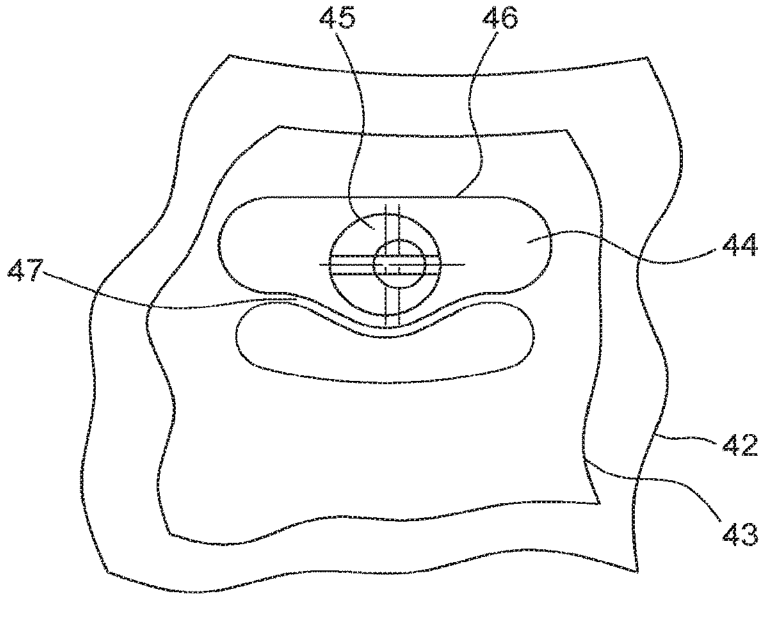
FIG. 6 represents a schematic top view of a device according to a second variant of the first embodiment in the area of a passage and an eccentric screw.

The second variant of the device of FIG. 6 shows a passage 44 of any shape, passage 44 is provided with an elastic wall 47 passing through said passage. Elastic wall 47 is configured to surround eccentric screw 45 on the other side of bearing face 46. Thus, elastic wall 47 applies pressure on screw 45 to wedge it against bearing face 46. Elastic wall 47 makes it possible to ensure that the screw is always in contact with bearing face 46, whatever the angular position of screw 45.

Figure 7:
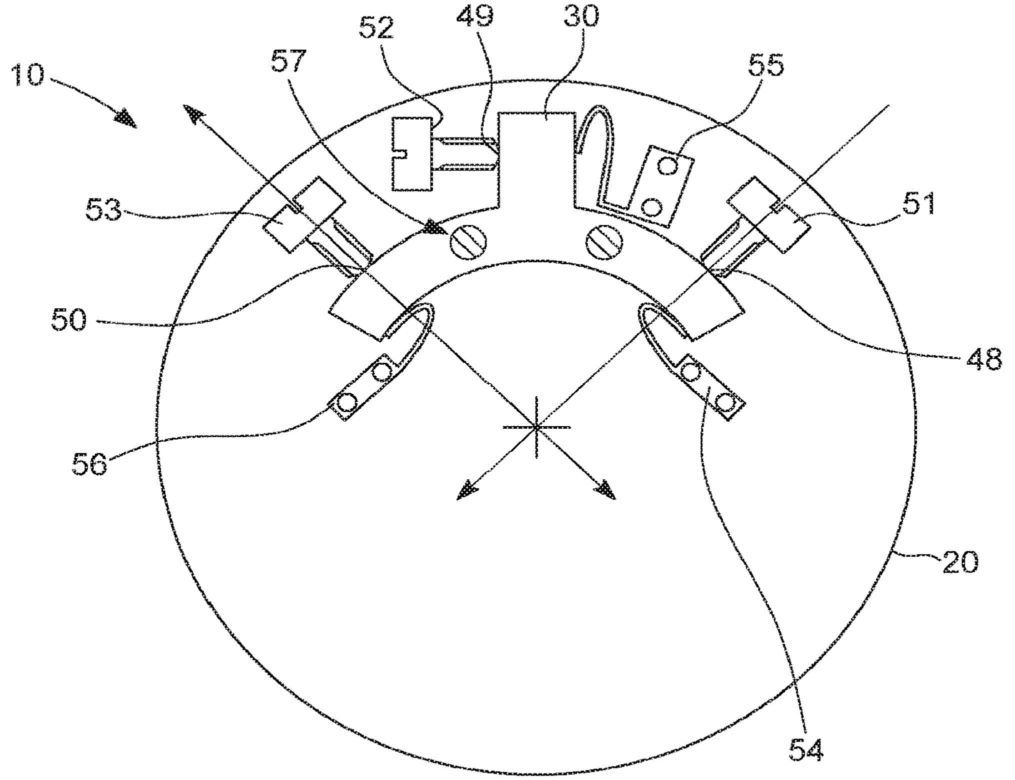
FIG. 7 represents a schematic top view of a device according to a second embodiment of the invention.

FIG. 7 represents a second embodiment of a device for assembly and alignment 10 on a first bridge 20, such as a timepiece movement plate. Device 10 comprises a second T-shaped bridge 30 whose upper bar is curved in a concave shape. Bearing faces 48, 49, 50 of device 10 are formed by the external walls of second bridge 30. Two bearing faces 48, 50 are curved external walls arranged at the ends of the curved bar, whereas third bearing face 49 is on a side wall of the straight bar of the T.

The adjustment means are screws 51, 52, 53 arranged in the second plane. Screws 51, 52, 53 are not necessarily eccentric; the function of their shaft is to come into contact with bearing face 48, 49, 50 to change the position of second bridge 30 when screw 51, 52, 53 is actuated.

To hold bearing faces 48, 49, 50 against screws 51, 52, 53, the adjustment means comprise prestressing means 54, 55, 56 arranged opposite each screw 51, 52, 53, on the other side of each bar of second bridge 30. The prestressing means 54, 55, 56 are springs formed of a curved strip resting against each bar. The springs are fixed to first bridge 20. The springs are configured to exert a pressure on each bar of second bridge 30, in order to press each bearing face 48, 49, 50 against screws 51, 52, 53. Actuating a screw in one direction pushes the bearing surface 48, 49, 50 compressing the spring. In the opposite direction, bearing face 48, 49, 50 is pushed back against the screw by the springs.

Two screws 51, 53 are preferably oriented in perpendicular directions, whereas the third screw 52 is oriented in a direction forming an angle of 45° with the directions of the other screws 51, 53. Via these adjustment means, the same centres of rotation are obtained as in the first embodiment of the device.

Device 10 comprises means 57 for locking second bridge 30 onto the first bridge. Locking means 57 are, for example, standard screws arranged perpendicularly to the planes of the two bridges 20, 30. The screws pass through second bridge 30 and are fixed to first bridge 20.

Figure 8:
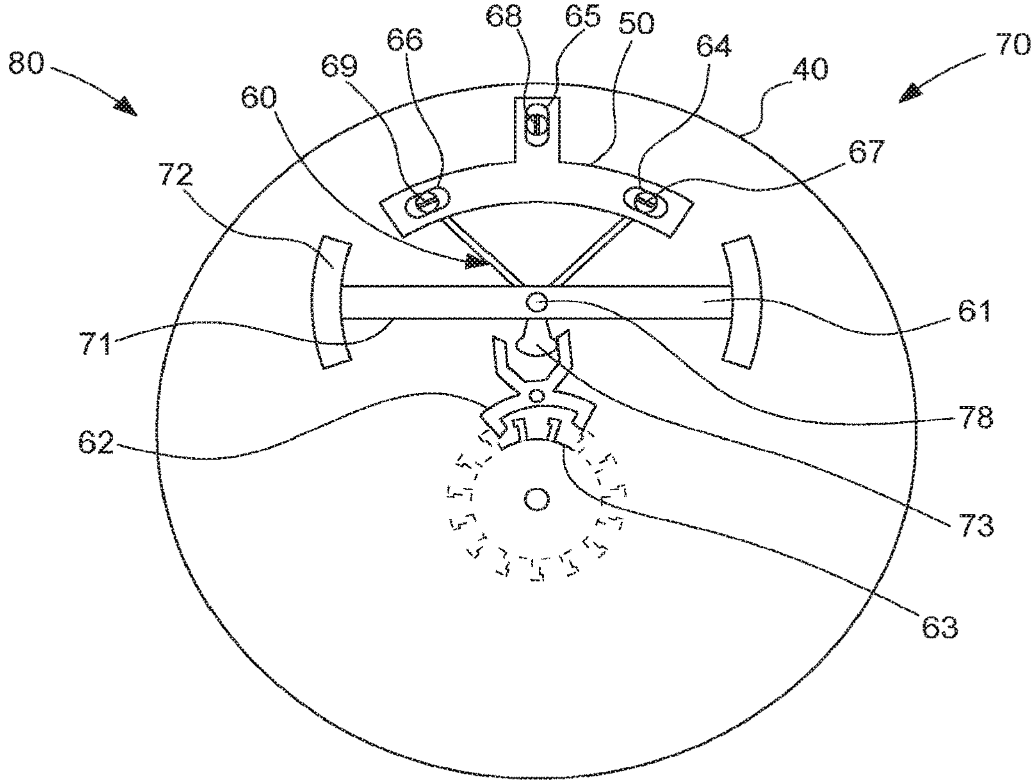
FIG. 8 represents a schematic top view of a resonator mechanism comprising an assembly and alignment device according to the invention.

The invention also relates to a timepiece resonator mechanism 80 provided with a device 70 according to the invention. The resonator mechanism 80 of FIG. 8 comprises a plate, like first bridge 40, a second bridge 50, a flexure pivot 60, a balance 61, a pallet fork 62 and an escape wheel 63. Second bridge 50 and the adjustment means are a third embodiment of the device according to the invention. Second bridge 50 is T-shaped like that of the second embodiment, but the adjustment means are those of the first embodiment. Second bridge 50 has three oblong passages 64, 65, 66 in which are arranged eccentric screws 67, 68, 69. Passages 64, 65, 66 are arranged at the ends of each bar of the T, each along an axis of its bar. Flexible pivot 60 has two flexure strips connecting each curved end of the T to the middle 78 of the balance 61. The flexure strips allow balance 61 to make an oscillating motion. Balance 61 has an axial arm 71 provided with a counterweight 72 at each end. Arm 72 also has a lug 73 extending from middle 78 of balance 61. When it oscillates, lug 73 of the balance periodically moves pallet fork 62 in one direction and then the other. Pallet fork 62 controls the rotation of escape wheel 63 by periodically inserting itself into the slots of wheel 60 which is driven by a mainspring.

Naturally, the invention is not limited to the embodiments described with reference to the Figures and variants could be envisaged without departing from the scope of the invention.

The invention claimed is:

1. A device for assembly and alignment on a first bridge or bar, forming a timepiece movement plate, arranged in a first plane, the device comprising:

a second bridge or bar arranged in a second plane, the second bridge being intended to carry a moving component of a timepiece resonator mechanism, the second bridge including an axial portion and first and second side arms extending from either side of the axial portion from an end of the axial portion, and means for aligning the second bridge on the first bridge, the means for aligning including first and second bearing faces respectively provided on first and second oblong passages disposed in the first and second side arms of the second bridge, and a third bearing face provided on a third oblong passage disposed in the axial portion and extending in a direction parallel to the axial portion, the first, second, and third bearing faces being orthogonal to the second plane in three different directions, and first, second, and third movable adjustment pieces mechanically connected to the first bridge, the first, second, and third movable adjustment pieces each being configured to come into contact with the first, second, and third bearing faces to position the second bridge in a determined position on the first bridge, the movable adjustment pieces configured to define a plurality of positions of the second bridge on the first bridge, and wherein the first and second bearing faces are substantially perpendicular to each other, and the third bearing face forms an angle of 45° with each of the first and second bearing faces.

2. The device according to claim 1, wherein the first, second, and third bearing faces are arranged at vertices of an isosceles triangle.

3. The device according to claim 1, wherein each adjustment piece is rounded to form a pivot around which one of the bearing faces can rotate when an adjustment piece is actuated.

4. The device according to claim 1, wherein each bearing face borders a passage to the first bridge, the movable adjustment pieces each being arranged in one of said passages.

5. The device according to claim 4, wherein the adjustment pieces are screws each arranged in one of the passages orthogonally to the second plane, each screw being provided with a head and a shaft, at least one of said screws being eccentric, the head being intended to be in contact with the bearing face.

6. The device according to claim 5, wherein each passage has a width substantially equal to a width of the head of the screws.

7. The device according to claim 1, wherein the adjustment pieces are movable in rotation.

8. The device according to claim 1, wherein the adjustment pieces are movable in translation.

9. The device according to claim 1, wherein the first bridge has graduations for indicating a position of the second bridge.

10. The device according to claim 1, wherein the device comprises means for locking the second bridge on the first bridge.

11. A resonator mechanism for timepiece movements, comprising a first bridge, forming a timepiece movement plate, wherein the resonator mechanism comprises an assembly and alignment device according to claim 1.

* * * * *